(12) United States Patent
Oh et al.

(10) Patent No.: US 11,166,347 B2
(45) Date of Patent: Nov. 2, 2021

(54) INDUCTION HEATING DEVICE

(71) Applicant: LG Electronics Inc., Seoul (KR)

(72) Inventors: Dooyong Oh, Seoul (KR); Byeong Wook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 382 days.

(21) Appl. No.: 16/308,170

(22) PCT Filed: May 31, 2017

(86) PCT No.: PCT/KR2017/005709
§ 371 (c)(1),
(2) Date: Dec. 7, 2018

(87) PCT Pub. No.: WO2017/213376
PCT Pub. Date: Dec. 14, 2017

(65) Prior Publication Data
US 2019/0182908 A1 Jun. 13, 2019

(30) Foreign Application Priority Data
Jun. 7, 2016 (KR) .................. 10-2016-0070535

(51) Int. Cl.
*H05B 6/12* (2006.01)
*H05B 6/04* (2006.01)
(Continued)

(52) U.S. Cl.
CPC ............ *H05B 6/065* (2013.01); *H05B 6/062* (2013.01); *H05B 6/129* (2013.01); *H05B 6/1272* (2013.01);
(Continued)

(58) Field of Classification Search
CPC .... H05B 2213/07; H05B 6/062; H05B 6/065; H05B 6/1254; H05B 6/1272; H05B 6/129; H05B 6/44; Y02B 40/00; Y02B 40/126
(Continued)

(56) References Cited

U.S. PATENT DOCUMENTS

| 5,808,280 A | 9/1998 | Gaspard |
| 2009/0084777 A1* | 4/2009 | Oh ........................ H05B 6/1254 219/672 |

(Continued)

FOREIGN PATENT DOCUMENTS

| CN | 203827543 | 9/2014 |
| EP | 0716560 | 6/1996 |

(Continued)

OTHER PUBLICATIONS

Extended European Search Report in European Application No. 17810499.8, dated Jan. 8, 2020, 9 pages.

(Continued)

*Primary Examiner* — Quang T Van
(74) *Attorney, Agent, or Firm* — Fish & Richardson P.C.

(57) ABSTRACT

An induction heating device includes a first coil that is wound about an axis by a first number of rotations, a second coil that is spaced apart from the first coil in a radial direction and that is disposed radially outward of the first coil, the second coil being wound about the axis by a second number of rotations, and a power supply unit configured to convert alternating current (AC) power and to supply a high-frequency AC to the first coil and to the second coil based on conversion of the AC power. The induction heating device is configured to output a maximum output level in a range from 6500 W to 7500 W based on a ratio between the first number of rotations and the second number of rotations.

20 Claims, 6 Drawing Sheets

(51) Int. Cl.
*H05B 6/06* (2006.01)
*H05B 6/44* (2006.01)

(52) U.S. Cl.
CPC ........... *H05B 6/44* (2013.01); *H05B 2213/07* (2013.01); *Y02B 40/00* (2013.01)

(58) Field of Classification Search
USPC ....... 219/624, 620, 621, 622, 623, 625, 626, 219/600, 627, 660, 662, 664, 666, 671, 219/675; 99/325
See application file for complete search history.

(56) References Cited

U.S. PATENT DOCUMENTS

2011/0253706 A1* 10/2011 Wang .................. H05B 6/1272
219/624

2012/0261405 A1* 10/2012 Kurose .................. H05B 6/44
219/620

FOREIGN PATENT DOCUMENTS

| EP | 2170010 | 3/2010 |
|---|---|---|
| EP | 2770801 | 8/2014 |
| JP | 2012-003915 A | 1/2012 |
| JP | 2012099338 | 5/2012 |
| JP | 2014-086240 A | 5/2014 |
| JP | 5807161 B2 | 7/2014 |
| KR | 10-2004-0089074 A | 10/2004 |
| KR | 10-1096103 B1 | 8/2011 |

OTHER PUBLICATIONS

European Search Report in European Appln. No. 17810499.8, dated Jun. 22, 2020, 9 pages.

* cited by examiner

INDUCTION HEATING DEVICE

CROSS-REFERENCE TO RELATED APPLICATIONS

This application is a National Stage application under 35 U.S.C. § 371 of International Application No. PCT/KR2017/005709, filed on May 31, 2017, which claims the benefit of Korean Application No. 10-2016-0070535, filed on Jun. 7, 2016. The disclosures of the prior applications are incorporated by reference in their entirety.

TECHNICAL FIELD

The present disclosure relates to an induction heating device, and more particularly, to an induction heating device configured to heat an object by using an induction heating method.

BACKGROUND

Various types of cooking devices can be used to heat food in homes and restaurants. For example, gas ranges use gas as a fuel. In another example, cooking devices may heat an object such a cooking vessel or a cooking pot using electricity.

A method of heating an object using electricity can include a resistance heating method and an induction heating method. In an electric resistance method, heat may be generated based on a current flowing through a metal-resistant wire or a non-metallic heating element such as silicon carbide. In this method, heat may be transmitted to the object through radiation or conduction. In the induction heating method, an eddy current may be generated in an object that is made of a metal component based on a magnetic field that occurs around a coil when a predetermined magnitude of high-frequency power is applied to the coil. In the induction heating method, the object itself may be heated based on the eddy current.

In some examples, the induction heating method may be performed as follows. When power is applied to the induction heating device such as an induction range, a predetermined magnitude of high-frequency voltage may be applied to the coil. As a result, an induction magnetic field may form around the coil. When a magnetic force line of the induction magnetic field passes through a bottom of the object including a metal component that is placed on an upper portion of the induction heating device, an eddy current may occur in the bottom of the object. When the eddy current flows through the bottom of the object, the object itself may be heated.

In some cases, when the induction heating device is used, an upper plate portion of the induction heating device may not be heated while the object is heated. When the object is lifted from the upper plate portion of the induction heating device, the induction magnetic field formed around the coil may disappear and heating of the object may be stopped. In some cases, the upper plate portion may maintain a relatively low temperature because the coil is not heated, and thus the induction heating device has an advantage of safety. In some cases, the induction heating device has an advantage of a higher energy efficiency in comparison to a gas range or a device using the resistance heating method because induction heating may heat the object itself rather than the coil.

In some cases, the induction heating device may heat an object in a shorter period than devices using other methods. For example, the higher the output of the induction heating device, the faster the object can be heated. In some cases, a maximum output of the induction heating device may be limited to a range of 3000 W to 5500 W. In many cases, it may be desirable to increase a maximum output range of an induction heating device.

SUMMARY

The present disclosure provides an induction heating device having a maximum output that exceeds a maximum output range of other induction heating devices.

The present disclosure also provides an induction heating device capable of heating an object more quickly based on a higher maximum output.

The objects of the present disclosure are not limited to the above-mentioned objects, and the other objects and the advantages of the present disclosure which are not mentioned can be understood by the following description, and more clearly understood by the implementations of the present disclosure. It will be also readily seen that the objects and the advantages of the present disclosure may be realized by means indicated in the patent claims and a combination thereof.

According to one aspect of the subject matter described in this application, an induction heating device includes a first coil that is wound about an axis by a first number of rotations, a second coil that is spaced apart from the first coil in a radial direction and that is disposed radially outward of the first coil, the second coil being wound about the axis by a second number of rotations, and a power supply unit configured to convert alternating current (AC) power and to supply a high-frequency AC to the first coil and to the second coil based on conversion of the AC power. The induction heating device is configured to output a maximum output level in a range from 6500 W to 7500 W based on a ratio between the first number of rotations and the second number of rotations.

Implementations according to this aspect may include one or more of the following features. For example, the ratio between the first number of rotations and the second number of rotations may be in a range from 1.5 to 1.7. In some cases, the ration may include any one of 18:11, 17:11, 17:10, or 16:10. In some examples, the maximum output level of the induction heating device may be in a range from 7000 W to 7500 W. In some cases, the ratio between the first number of rotations and the second number of rotations may be any one of 18:11, 17:11, or 16:10. In some examples, an output frequency of the high-frequency AC may be in a range from 25 kHz to 35 kHz.

In some implementations, the induction heating device may further include one or more first shielding sheets disposed at a lower portion of the first coil and configured to restrict transmission of an electromagnetic wave, and one or more second shielding sheets disposed at a lower portion of the second coil and configured to restrict transmission of an electromagnetic wave. In some implementations, the induction heating device may be configured to output the maximum output level based on the ratio between the first number of rotations and the second number of rotations being equal to 17:11.

In some implementations, the second coil may be spaced apart from the first coil by a predetermined distance in the radial direction. In some examples, the first coil and the second coil are coplanar. In some implementations, the induction heating device may further include a coil base that includes an upper surface configured to seat the first coil and the second coil, and a lower surface configured to seat one or more shielding sheets that are configured to restrict transmission of an electromagnetic wave through the coil base.

In some examples, the coil base may define one or more accommodating portions that are recessed from the lower surface of the coil base, that are arranged about the axis, and that are configured to receive the one or more shielding sheets, respectively. In some examples, the coil base may include a first base configured to seat the first coil, a second base spaced apart from the first base in the radial direction and disposed radially outward of the first base, the second base being configured to seat the second coil, and one or more connection portions that extend from the first base to the second base in the radial direction.

According to another aspect, an induction heating device includes an induction assembly that includes a first coil that is wound about an axis by a first number of rotations, and a second coil that is spaced apart from the first coil in a radial direction and that is disposed radially outward of the first coil, where the second coil is wound about the axis by a second number of rotations. The induction heating device further includes an interface unit configured to adjust an output of the induction assembly, and a power supply unit configured to supply power to the induction assembly and to the interface unit. The induction heating device is configured to output a maximum output level in a range from 6500 W to 7500 W based on a ratio between the first number of rotations and the second number of rotations.

Implementations according to this aspect may include one or more of the features described above and the flowing features. For example, the ratio between the first number of rotations and the second number of rotations may be in a range from 1.5 to 1.7. In some instances, the ratio may be any one of 18:11, 17:11, 17:10, or 16:10. In some examples, the maximum output level the induction heating device is in a range from 7000 W to 7500 W. In some examples, the ratio between the first number of rotations and the second number of rotations is any one of 18:11, 17:11, or 16:10.

In some implementations, the power supply unit may be configured to supply a high-frequency AC to the first coil and to the second coil, where an output frequency of the high-frequency AC may be in a range from 25 kHz to 35 kHz. In some examples, the induction heating device further includes one or more first shielding sheets disposed at a lower portion of the first coil and configured to restrict transmission of an electromagnetic wave, and one or more second shielding sheets disposed on a lower portion of the second coil and configured to restrict transmission of an electromagnetic wave.

In some implementations, the induction heating device is configured to output the maximum output level based on the ratio between the first number of rotations and the second number of rotations being equal to 17:11. In some examples, the power supply unit is configured to supply power to both the first coil and the second coil based on the interface unit receiving a user input indicating an adjustment of the output of the induction heating device to the maximum output level.

DETAILED DESCRIPTION

Figure 1:
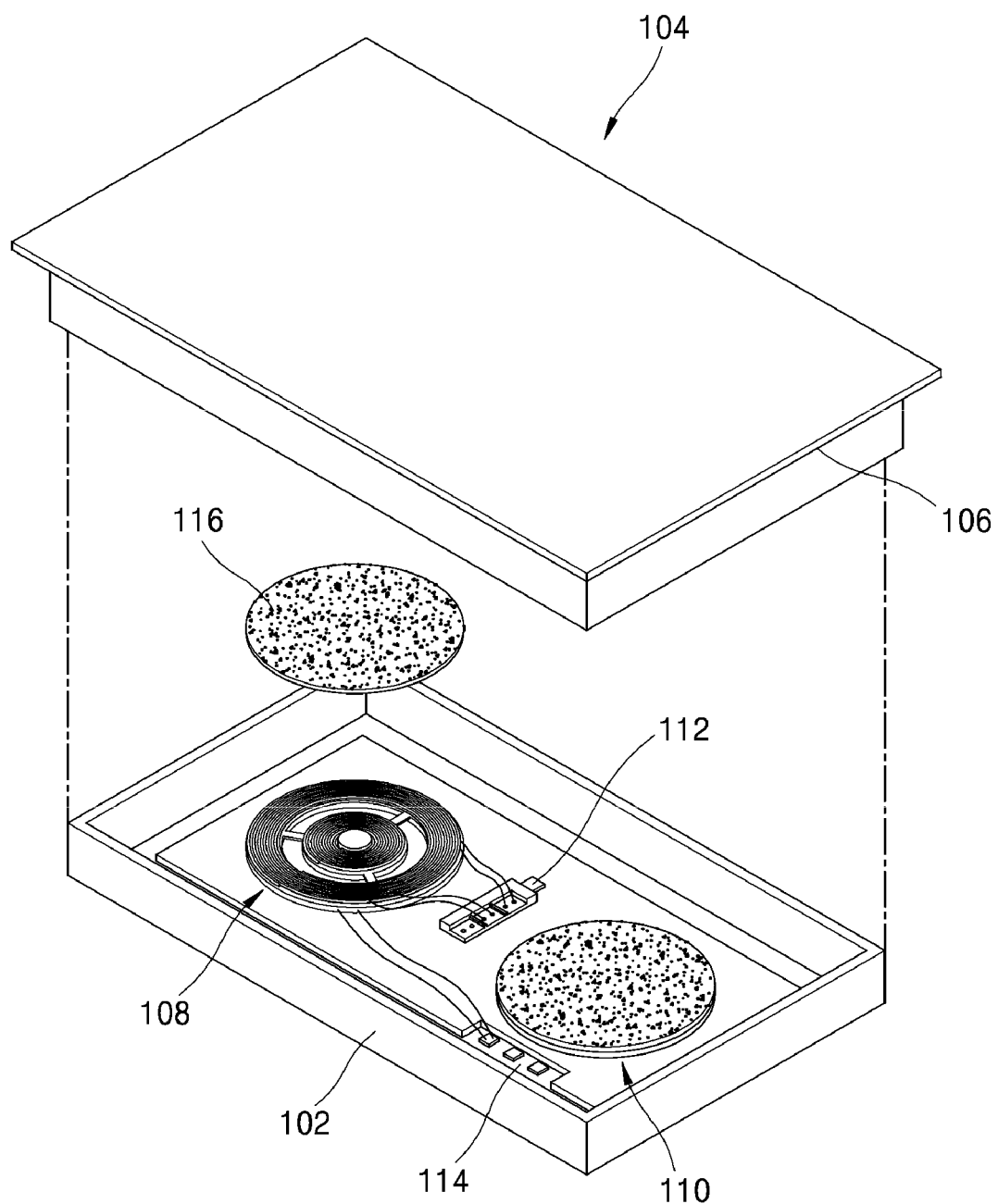
FIG. 1 is a perspective view illustrating an example induction heating device.

The aforementioned objects, features and advantages will be described in detail with reference to the accompanying drawings, such that those skilled in the art can easily carry out a technical idea of the present disclosure. In the description of the implementations, the detailed description of well-known related configurations or functions will be omitted when it is deemed that such description will cause ambiguous interpretation of the present disclosure. Hereinafter, example implementations of the present disclosure will be described in detail with reference to the accompanying drawings. In the drawings, same reference numerals designate same or like elements.

FIG. 1 is a perspective view illustrating an example induction heating device.

Referring to FIG. 1, the induction heating device may include a case 102 constituting a main body and a cover plate 104 coupled to the case 102 to seal the case 102.

The cover plate 104 may be coupled to an upper surface of the case 102 to seal a space formed inside the case 102 from an outside. The cover plate 104 may include an upper plate portion 106 on which an object such as a cooking vessel can be placed. In some implementations, the upper plate portion 106 may be made of a tempered glass material such as ceramic glass.

Referring again to FIG. 1, induction assemblies 108 and 110 configured to heat an object may be disposed in the space formed inside the case 102. Also, an interface unit 114 configured to adjust outputs of the induction assemblies 108 and 110 and a power supply unit 112 configured to supply power to the induction assemblies 108 and 110 and the interface unit 114 may be disposed in the case 102. FIG. 1 illustrates two induction assemblies 108 and 110 disposed in the case 102, for example. In other implementations, two or more induction assemblies may be disposed in the case 102.

The induction assemblies 108 and 110 each may include a coil configured to form an induction magnetic field by using a high-frequency alternating current (AC) supplied by the power supply unit 112, and a heat insulation sheet 116 configured to protect the coil from heat generated by the object. Also, although not illustrated in FIG. 1, the induction assemblies 108 and 110 each may further include a temperature sensor configured to measure temperature of the object.

As illustrated in FIG. 1, the coils included in the induction assemblies 108 and 110 each may be electrically connected to the power supply unit 112 through a conducting wire to directly receive power from the power supply unit 112. Further, the induction assemblies 108 and 110 each may be also electrically connected to the interface unit 114 through the conducting wire. Accordingly, a user may adjust the outputs of the induction assemblies 108 and 110 as desired through operation of the interface unit 114.

Hereinafter, a configuration of the induction assemblies 108 and 110 illustrated in FIG. 1 will be described in more detail.

Figure 2:
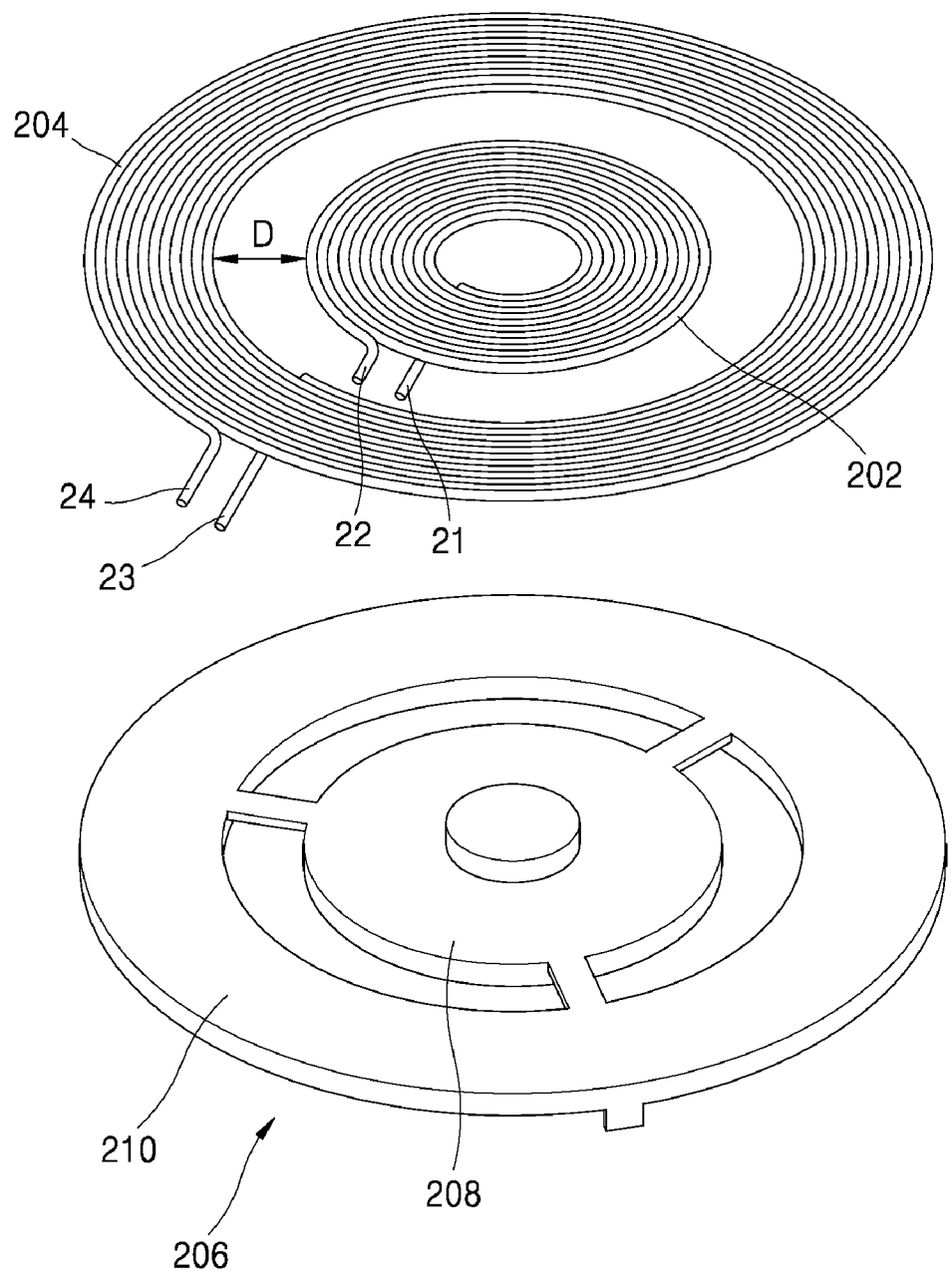
FIG. 2 is a perspective view illustrating an example induction assembly included in an example induction heating device.

FIG. 2 is a perspective view illustrating an example induction assembly included in an example induction heating device.

Referring to FIG. 2, the induction assembly may include a first coil 202, a second coil 204, and a coil base 206 configured to fix the first coil 202 and the second coil 204.

The induction assembly of the induction heating device may include the two coils 202 and 204 spaced apart from each other by a predetermined distance D as illustrated in FIG. 2. In some examples where the induction assembly includes two different coils, it may be easy to control an output of the induction heating device according to a use. For example, when the user desires a relatively low output, power may be supplied only to any one of the first coil 202 or the second coil 204 included in the induction assembly. In some examples, when the user desires a relatively high output or maximum output, power may be supplied to both the first coil 202 and the second coil 204 included in the induction assembly. For example, when the user operates to heat the object at the maximum output through the interface unit 114, power may be supplied to both the first coil 202 and the second coil 204, and as a result, the induction heating device may operate at the maximum output.

Referring again to FIG. 2, the induction assembly may include a first coil 202 wound in a radial direction by a first number of rotations, and a second coil 204 wound in a radial direction by a second number of rotations. As illustrated in FIG. 2, the second coil 204 may be spaced apart from the first coil by a predetermined distance D, and may be disposed outside the first coil 202. Also, opposite ends 21 and 22 of the first coil 202 and opposite ends 23 and 24 of the second coil 204 each may be electrically connected to the power supply unit 112. The opposite ends 21 and 22 of the first coil 202 and the opposite ends 23 and 24 of the second coil 204 each may be directly connected to the power supply unit 112 or may be connected to the power supply unit 112 through the conducting wire.

Figure 4:
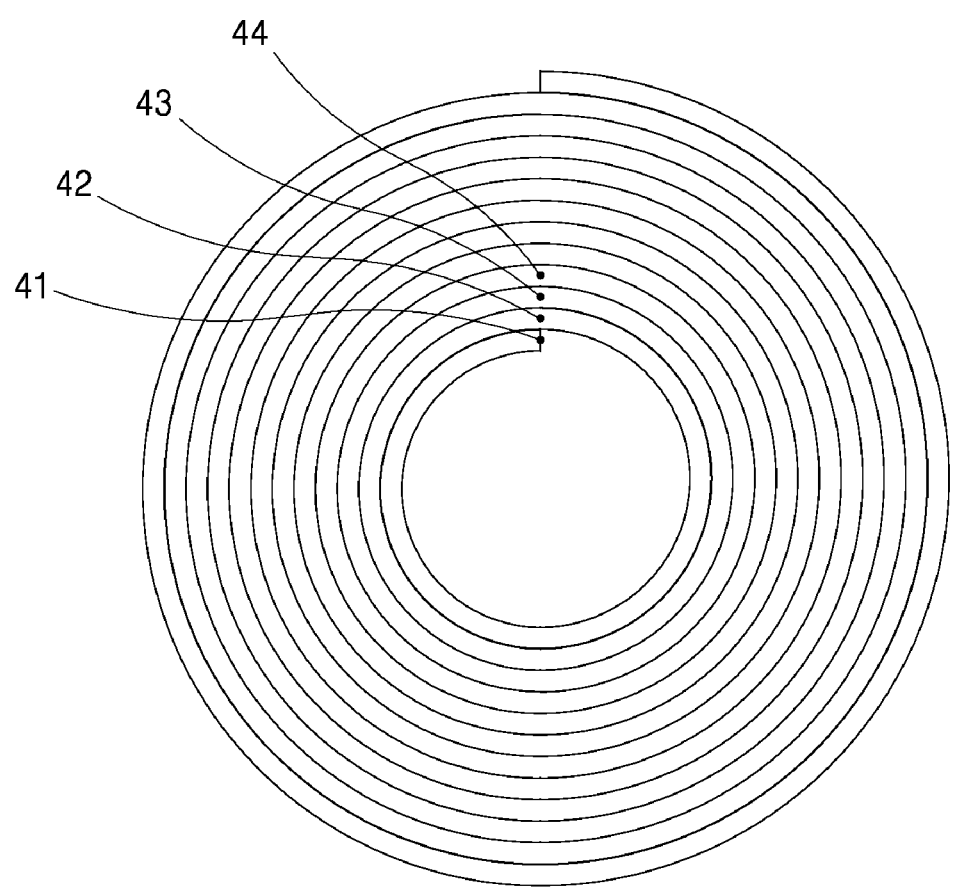
FIG. 4 is a view illustrating an example coil that is wound by an example number of rotations.

In the present disclosure, "the number of rotations" of the coil refers to the number of times the coil is wound in a circumferential direction. FIG. 4 is a view illustrating an example number of rotations of an example coil. Referring to FIG. 4, the number of rotations of the coil may be calculated on the basis of points 41, 42, 43, and 44 lying on the same straight line in a radial direction. For example, when the coil is wound from the point 41 to the point 42 of the coil illustrated in FIG. 4, the number of rotations of the coil may be 1. Similarly, when the coil is wound from the point 41 to the point 42, the number of rotations of the coil may be 2, and when the coil is wound from the point 41 to the point 43, the number of rotations of the coil may be 3.

In some implementations, the ratio between the first number of rotations of the first coil 202 and the second number of rotations of the second coil 204 may be set differently according to the maximum output of the induction assembly or the induction heating device. For example, the induction heating device may have a maximum output of at least 6000 W. In some implementations, the induction heating device may have a maximum output of 6500 W to 7500 W. In these implementations, the ratio between the first number of rotations and the second number of rotations may be determined to be any one of 18:11, 17:11, 17:10, or 16:10.

In some implementations, the induction heating device may have a maximum output of 7000 W to 7500 W. In these implementations, the ratio between the first number of rotations and the second number of rotations may be determined to be any one of 18:11, 17:11, or 16:10.

In some implementations, the high-frequency AC supplied to the first coil 202 and the second coil 204 may have an output frequency of 25 kHz to 35 kHz.

Referring again to FIG. 2, the induction assembly may include a coil base 206 configured to fix the first coil 202 and the second coil 204. The coil base 206 may include a first base 208 on which the first coil 202 is disposed and a second base 210 on which the second coil 204 is disposed. The first base 208 and the second base 210 may be spaced apart from each other by a predetermined distance D or more.

Figure 3:
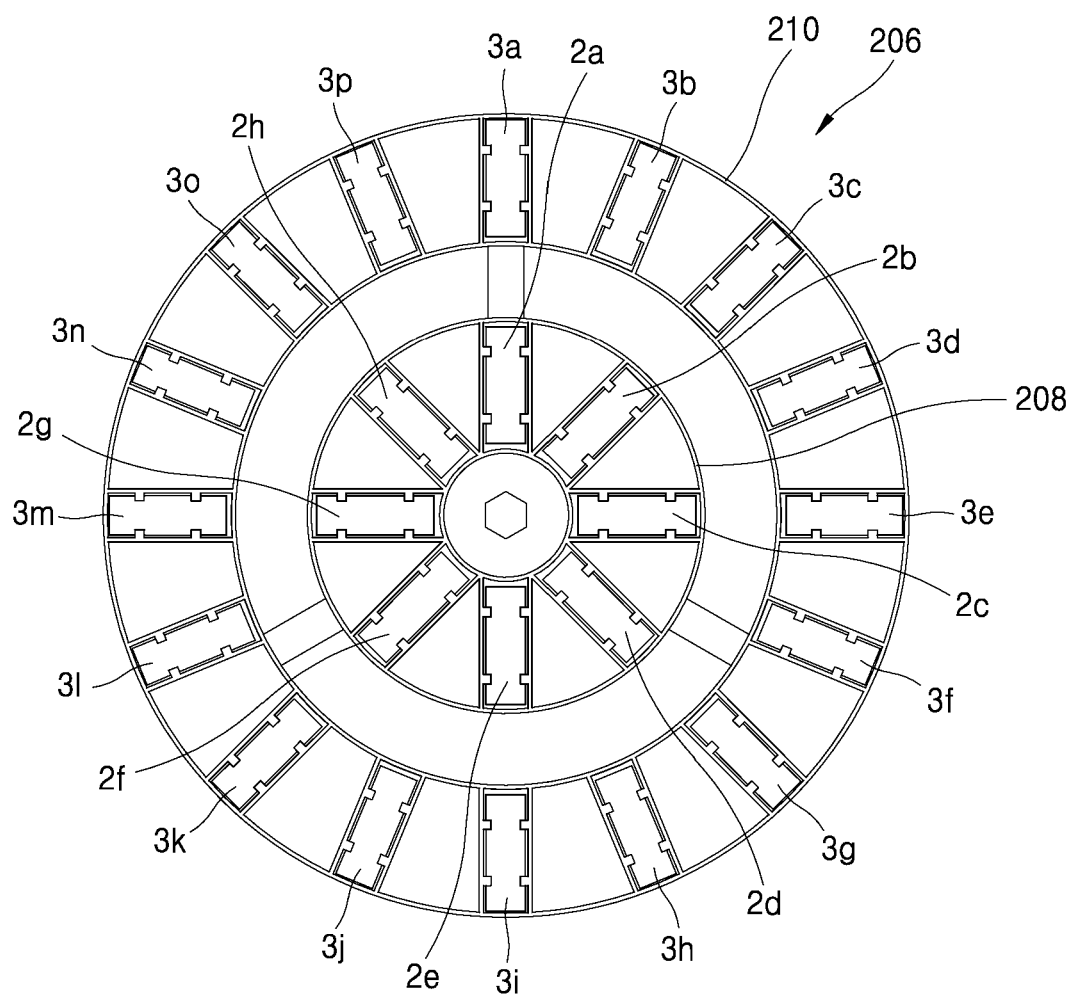
FIG. 3 is a rear view illustrating an example coil base included in an example induction assembly.

FIG. 3 is a rear view illustrating an example coil base included in an example induction assembly.

Referring to FIG. 3, a lower portion of the coil base 206 included in the induction assembly may be provided with first shielding sheet accommodating portions 2a to 2h configured to accommodate one or more first shielding sheets, and second shielding sheet accommodating portions 3a to 3p configured to accommodate one or more second shielding sheets.

In some implementations, a lower portion of the first base 208 included in the coil base 206 may define the first shielding sheet accommodating portions 2a to 2h configured to accommodate one or more first shielding sheets. The first shielding sheets may be inserted into the first shielding sheet accommodating portions 2a to 2h, respectively. In some examples, an upper portion of the first base 208 may be provided with the first coil 202, and the lower portion of the first base 208 may be provided with one or more first shielding sheets. FIG. 3 illustrates a total of eight first shielding sheet accommodating portions 2a to 2h, but the number of the first shielding sheets disposed on the lower portion of the first base 208 may vary in some implementations. In some implementations, a lower portion of the second base 210 included in the coil base 206 may be provided with the second shielding sheet accommodating portions 3a to 3p configured to accommodate one or more second shielding sheets. The second shielding sheets may be inserted into the second shielding sheet accommodating portions 3a to 3p, respectively. In some examples, an upper portion of the second base 210 may be provided with the second coil 204, and the lower portion of the second base 210 may be provided with one or more second shielding sheets. FIG. 3 illustrates a total of sixteen second shielding sheet accommodating portions 3a to 3p, but the number of the second shielding sheets disposed on the lower portion of the second base 210 may vary in some implementations.

The first shielding sheet and the second shielding sheet disposed on the lower portion of the coil may respectively prevent an induction magnetic field formed by the first coil 202 and the second coil from being formed on the lower portions of the first coil 202 and the second coil 204, thereby enhancing output efficiency of the induction assembly. In some implementations, the first shielding sheet and the second shielding sheet each may be made of a material capable of shielding an electromagnetic wave, such as a ferrite sheet.

Hereinafter, the maximum output of the induction heating device and the ratio between the number of rotations of the first coil and the number of rotations of the second coil resulting therefrom will be described in more detail.

In some cases, a maximum output of an induction heating device according to the related art may be in a range of 3000 W to 5500 W. In such cases, the maximum output of the induction heating device may be insufficient to heat the object within a short time. By contrast, the induction heating device according to the present disclosure may have a maximum output of 6000 W or more so as to heat the object more quickly than the induction heating device according to the related art.

Figure 5:
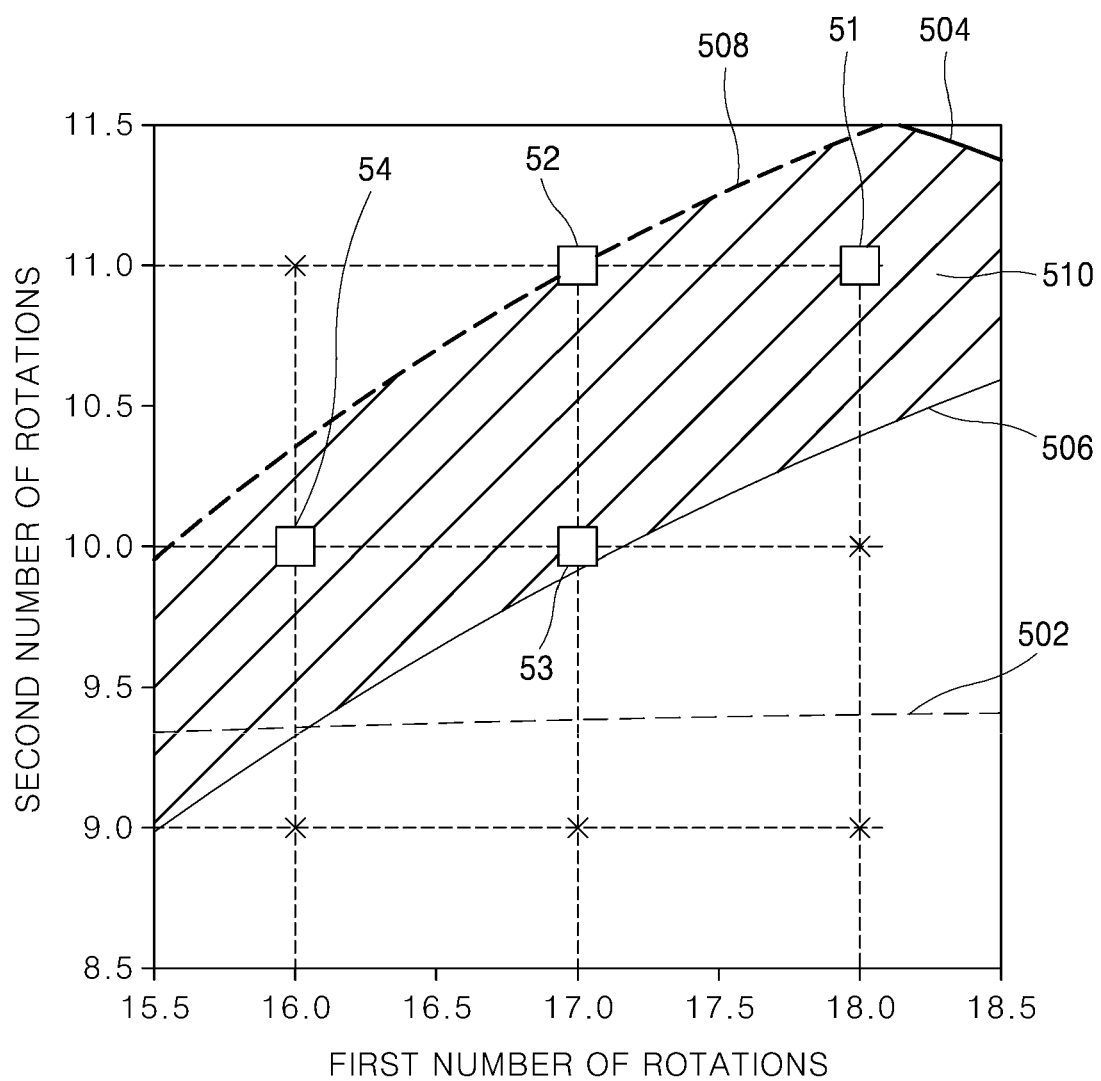
FIG. 5 is a graph illustrating example power ranges corresponding to example ratios between a first number of rotations of a first example coil and a second number of rotations of a second example coil.

FIG. 5 is a graph illustrating example power ranges corresponding to example ratios between a first number of rotations and a second number of rotations that meets a restriction condition.

In FIG. 5, a horizontal axis represents a first number of rotations, i.e., the number of times the first coil is wound, and a vertical axis represents a second number of rotations, i.e., the number of times the second coil is wound. Further, in FIG. 5, a line 502 represents a region where the frequency of the high-frequency AC applied to the first coil and the second coil is maintained at 25 kHz, and a line 504 represents a region where the frequency of the high-frequency AC applied to the first coil and the second coil is maintained at 35 kHz. Further, in FIG. 5, a line 506 represents a region where the maximum output of the induction heating device is 6500 W, and a line 508 represents a region where the maximum output of the induction heating device is 7500 W.

[Table 1] shows maximum outputs of the induction heating device that were measured as a result of exemplary experiments in which the first number of rotations and the second number of rotations were set to be different from each other.

TABLE 1

| First number of rotations | Second number of rotations | Maximum output [W] |
|---|---|---|
| 16 | 9 | 5588 |
| 16 | 11 | 7590 |
| 17 | 8 | 4195 |
| 17 | 8.5 | 4481 |
| 17 | 9 | 4866 |
| 17 | 10 | 6559 |
| 17 | 11 | 7488 |
| 18 | 9 | 4530 |
| 18 | 10 | 4885 |
| 18 | 11 | 7283 |

According to the experiment results illustrated in FIG. 5, points 51, 52, 53 and 54 are included in a region 510 where the maximum output of the induction heating device is 6500 W to 7500 W within an operating range where the frequency of the high-frequency AC applied to the first coil and the second coil is 25 kHz to 35 kHz.

Referring to the experimental results illustrated in FIG. 5 and [Table 1], the induction heating device according to the present disclosure may have a maximum output of 6500 W to 7500 W when the ratio between the first number of rotations and the second number of rotations is any one of 18:11, 17:11, 17:10 and 16:10. In some implementations, the ratio between the first number of rotations and the second number of rotations may be in a range from 1.5 to 1.7.

Figure 6:
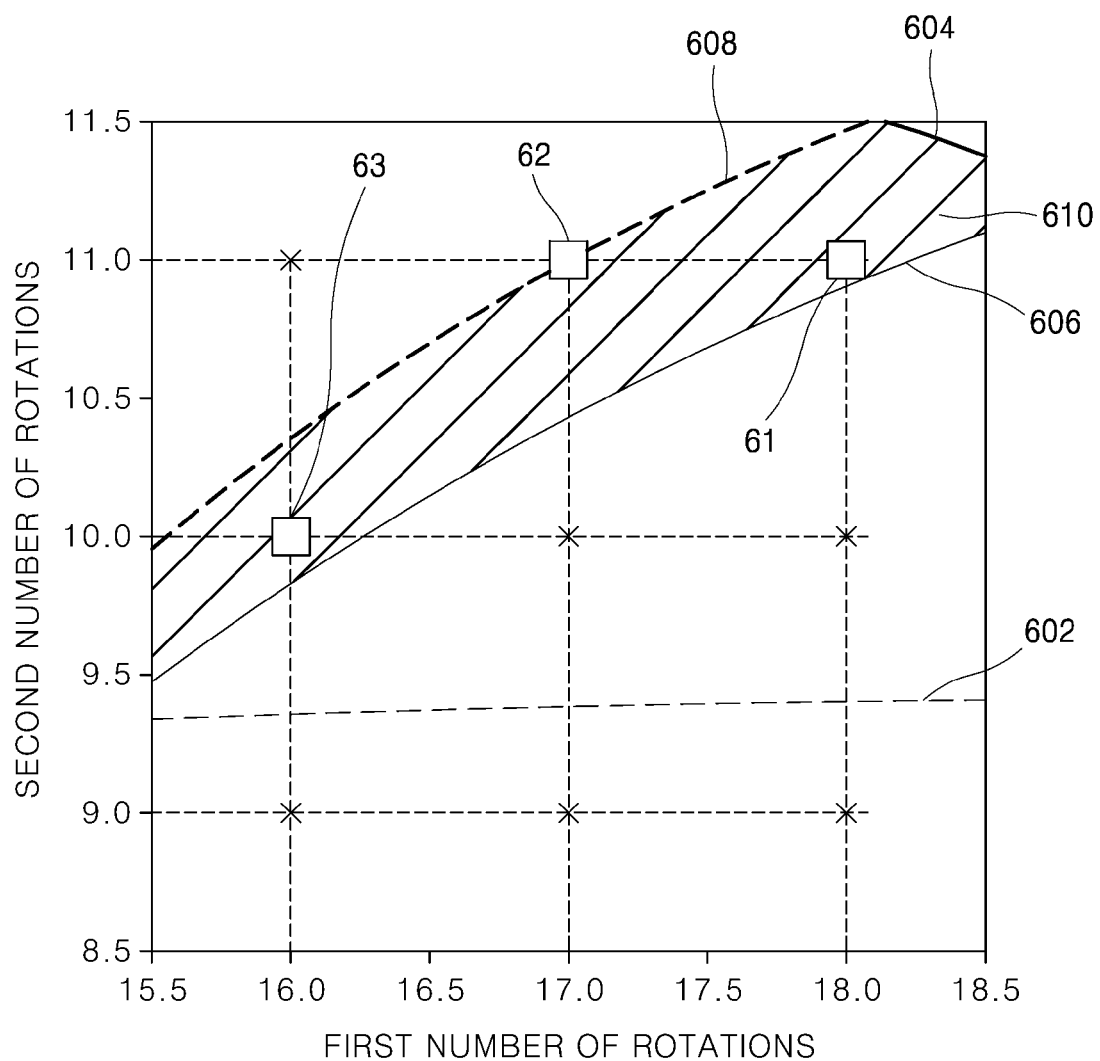
FIG. 6 is a graph illustrating another example power ranges corresponding to example ratios between a first number of rotations of a first example coil and a second number of rotations of a second example coil.

FIG. 6 is a graph illustrating example output power ranges corresponding to example ratios between a first number of rotations and a second number of rotations that meets a restriction condition according to another implementation of the present disclosure.

In FIG. 6, a horizontal axis represents a first number of rotations, i.e., the number of times the first coil is wound, and a vertical axis represents a second number of rotations, i.e., the number of times the second coil is wound. Further, in FIG. 6, a line 602 represents a region where the frequency of the high-frequency AC applied to the first coil and the second coil is maintained at 25 kHz, and a line 604 represents a region where the frequency of the high-frequency AC applied to the first coil and the second coil is maintained at 35 kHz. Further, in FIG. 6, a line 606 represents a region where the maximum output of the induction heating device according to the present disclosure is 6500 W, and a line 608 represents a region where the maximum output of the induction heating device according to the present disclosure is 7500 W.

According to the experiment results illustrated in FIG. 6, points 61, 62 and 63 are included in a region 610 where the maximum output of the induction heating device according to the present disclosure is 7000 W to 7500 W within an operating range where the frequency of the high-frequency AC applied to the first coil and the second coil is 25 kHz to 35 kHz. According to these results, when the ratio between the first number of rotations and the second number of rotations is any one of 18:11, 17:11, or 16:10, the induction heating device according to the present disclosure may a maximum output of 6500 W to 7500 W.

Referring to the experimental results illustrated in FIGS. 5 and 6, when the ratio between the number of rotations of the first coil and the number of rotations of the second coil, i.e., the ratio between the first number of rotations and the second number of rotations is any one of 18:11, 17:11, 17:10, or 16:10, the induction heating device according to the present disclosure may a maximum output of 6500 W to 7500 W. In particular, when the ratio between the first number of rotations and the second number of rotations is any one of 18:11, 17:11, or 16:10, the induction heating device according to the present disclosure may a maximum output of 7000 W to 7500 W. The maximum output of the induction heating device according to the present disclosure may greatly exceed a maximum output range of 3000 W to 5500 W of a conventional induction heating device. As a result, the induction heating device having a larger output according to the present disclosure may heat the object more quickly than the conventional induction heating device.

Since various substitutions, changes, and modifications can be made within the scope that does not deviate the technical idea of the present disclosure for those skilled in the art to which the present disclosure pertains, the present disclosure is not limited by the above-mentioned implementations and the accompanying drawings.

The invention claimed is:

1. An induction heating device comprising:
   a first coil that is wound about an axis by a first number of rotations;
   a second coil that is spaced apart from the first coil in a radial direction and that is disposed radially outward of the first coil, the second coil being wound about the axis by a second number of rotations;
   a coil base configured to seat the first coil and the second coil; and
   a power supply unit configured to convert alternating current (AC) power and to supply a high-frequency AC to the first coil and to the second coil based on conversion of the AC power,
   wherein the induction heating device is configured to output a maximum output level in a range from 6500 W to 7500 W based on a ratio between the first number of rotations and the second number of rotations, and
   wherein the coil base comprises:
      a first base configured to seat the first coil,
      a second base spaced apart from the first base in the radial direction and disposed radially outward of the first base, the second base being configured to seat the second coil, and one or more connection portions that extend from the first base to the second base in the radial direction.

2. The induction heating device of claim 1, wherein the ratio between the first number of rotations and the second number of rotations is in a range from 1.5 to 1.7.

3. The induction heating device of claim 1, wherein the maximum output level of the induction heating device is in a range from 7000 W to 7500 W.

4. The induction heating device of claim 3, wherein the ratio between the first number of rotations and the second number of rotations is any one of 18:11, 17:11, or 16:10.

5. The induction heating device of claim 1, wherein an output frequency of the high-frequency AC is in a range from 25 kHz to 35 kHz.

6. The induction heating device of claim 1, further comprising:
one or more first shielding sheets disposed at a lower portion of the first coil and configured to restrict transmission of an electromagnetic wave; and
one or more second shielding sheets disposed at a lower portion of the second coil and configured to restrict transmission of an electromagnetic wave.

7. The induction heating device of claim 1, wherein the induction heating device is configured to output the maximum output level based on the ratio between the first number of rotations and the second number of rotations being equal to 17:11.

8. An induction heating device comprising:
an induction assembly comprising:
a first coil that is wound about an axis by a first number of rotations, and
a second coil that is spaced apart from the first coil in a radial direction and that is disposed radially outward of the first coil, the second coil being wound about the axis by a second number of rotations;
an interface unit configured to adjust an output of the induction assembly;
a coil base configured to seat the first coil and the second coil; and
a power supply unit configured to supply power to the induction assembly and to the interface unit,
wherein the induction heating device is configured to output a maximum output level in a range from 6500 W to 7500 W based on a ratio between the first number of rotations and the second number of rotations, and
wherein the coil base comprises:
a first base configured to seat the first coil,
a second base spaced apart from the first base in the radial direction and disposed radially outward of the first base, the second base being configured to seat the second coil, and
one or more connection portions that extend from the first base to the second base in the radial direction.

9. The induction heating device of claim 8, wherein the ratio between the first number of rotations and the second number of rotations is in a range from 1.5 to 1.7.

10. The induction heating device of claim 8, wherein the maximum output level the induction heating device is in a range from 7000 W to 7500 W.

11. The induction heating device of claim 8, wherein the ratio between the first number of rotations and the second number of rotations is any one of 18:11, 17:11, or 16:10.

12. The induction heating device of claim 8, wherein the power supply unit is configured to supply a high-frequency alternating current (AC) to the first coil and to the second coil, and
wherein an output frequency of the high-frequency AC is in a range from 25 kHz to 35 kHz.

13. The induction heating device of claim 8, wherein the induction heating device is configured to output the maximum output level based on the ratio between the first number of rotations and the second number of rotations being equal to 17:11.

14. The induction heating device of claim 8, wherein the power supply unit is configured to supply power to both the first coil and the second coil based on the interface unit receiving a user input indicating an adjustment of the output of the induction heating device to the maximum output level.

15. The induction heating device of claim 1, wherein the second coil is spaced apart from the first coil by a predetermined distance in the radial direction.

16. The induction heating device of claim 1, wherein the first coil and the second coil are coplanar.

17. The induction heating device of claim 1, wherein the coil base includes:
an upper surface configured to seat the first coil and the second coil; and
a lower surface configured to seat one or more shielding sheets that are configured to restrict transmission of an electromagnetic wave through the coil base.

18. The induction heating device of claim 17, wherein the coil base defines one or more accommodating portions that are recessed from the lower surface of the coil base, that are arranged about the axis, and that are configured to receive the one or more shielding sheets, respectively.

19. The induction heating device of claim 8, wherein the coil base includes:
an upper surface configured to seat the first coil and the second coil; and
a lower surface configured to seat one or more shielding sheets that are configured to restrict transmission of an electromagnetic wave through the coil base.

20. The induction heating device of claim 19, wherein the coil base defines one or more accommodating portions that are recessed from the lower surface of the coil base, that are arranged about the axis, and that are configured to receive the one or more shielding sheets, respectively.

* * * * *